United States Patent [19]

Corrigall et al.

[11] 4,450,340
[45] May 22, 1984

[54] ARC WELDER POWER SUPPLY WITH FAIL-SAFE VOLTAGE REDUCING CIRCUIT

[75] Inventors: Don J. Corrigall; Marvin L. Schiedermayer, both of Appleton, Wis.

[73] Assignee: Miller Electric Manufacturing Company, Appleton, Wis.

[21] Appl. No.: 448,866

[22] Filed: Dec. 10, 1982

[51] Int. Cl.³ .............................................. B23K 9/10
[52] U.S. Cl. ................................. 219/132; 219/130.32
[58] Field of Search ............. 219/132, 130.31, 137 PS, 219/130.32

[56] References Cited

U.S. PATENT DOCUMENTS 2,617,913 11/1952 Oestreicher ......................... 219/132
4,100,390 7/1978 Jackson ............................... 219/132

Primary Examiner—C. C. Shaw
Attorney, Agent, or Firm—Sughrue, Mion, Zinn, Macpeak and Seas

[57] ABSTRACT

A fail-safe voltage reducing circuit for an arc welder. The welding transformer has two primary windings connected in parallel across a power source. After an arc is struck, if the arc is then broken for a predetermined time period, the circuit automatically disconnects one of the primary windings from the power source, thereby reducing the voltage across the welder's output terminals to a safe standby voltage lower than the full open circuit voltage. If the voltage has not been reduced after a second predetermined time period, the fail-safe feature of the circuit automatically disconnects both primary windings from the power source, thereby completely removing all power from the welder.

6 Claims, 4 Drawing Figures

ALTERNATIVE PRIMARY CONNECTION

ALTERNATIVE PRIMARY CONNECTION

ARC WELDER POWER SUPPLY WITH FAIL-SAFE VOLTAGE REDUCING CIRCUIT

BACKGROUND OF THE INVENTION

1. Field of the Invention

This invention relates generally to arc welders which include means for reducing the open circuit voltage (OCV) when welding is not actually occurring and, more particularly, to such a power supply having an improved voltage reducing means including a fail-safe circuit which interrupts the power supply if the voltage-reducing circuit should not operate properly.

2. Description of the Prior Art

When utilizing certain types of electric power supplies for paticular arc welding applications, there exists a potential operator hazard due to the magnitude of voltage normally present at the output terminals of the power supply. Power supplies used for stick welding may have output voltages up to 80VAC (RMS) with no contactor or other means of removing this voltage from the output terminals when a weld is not actually being made. Under normal circumstances where the welder is dry and the operator can stay out of contact with the workpiece, the problem has been relatively small. However, under wet conditions and/or in confined spaces, the continuous presence of the relatively high open circuit voltage (OCV) can present a safety problem which is recognized by current federal regulations and industry standards.

Voltage reducers for arc welders are broadly known. For example, U.S. Pat. No. 2,775,735 discloses an automatic voltage reducing circuit employing a voltage divider and relays for automatically reducing the no-load voltage when the arc is interrupted and not re-struck within a predetermined minimum time period; this circuit does not contain a fail-safe function. U.S. Pat. No. 4,151,396 discloses a safety system which includes an automatically controlled switch prevents uncontrolled open circuit voltage from existing at the electrode holder when the welding arc is interrupted; however, there is no time delay or fail-safe function.

SUMMARY OF THE INVENTION

The object of the invention is to provide an arc welder supply with an improved voltage reducing circuit which is essentially solid state and which is fail-safe, i.e. which will automatically disconnect the welder from its power source if the voltage reducing circuit does not function properly, thereby increasing the safety of the operator in those relatively rare situations where there may be a potential hazard by maintaining OCV at the welding electrode when the operator is not actually welding. This invention minimizes this potential hazard by maintaining a relatively lower voltage at the welder output terminals until such time as the arc is acually struck. Then, the striking of the arc is sensed, and at this instant the electrical circuits are automatically switched into their normal operating configuration so that welding takes place as in a normal welding machine. When the arc is interrupted, a time delay is initiated. If the arc is not re-established when the time delay elapses, the electrical circuits are re-configured again to produce only the low standby voltage until such time as another arc is struck. If the arc is interrupted only momentarily and re-established before the time delay elapses, then the time delay mechanism is reset, and the circuits remain in their normal welding configuration. As an additional safety measure, the voltage reducing circuit is made fail-safe by a secondary back-up circuit which operates completely to shut down the welder should any element in the voltage reducing circuit malfunction such that the full OCV improperly remains at the welder output terminals. More specifically, when the arc is interrupted, the welder output voltage will go to full OCV for a predetermined time interval and then go to the substantially lower standby voltage unless an arc is re-established within this interval. However, when the arc is interrupted, a second time delay interval is also initiated; if the normal OCV is still present at the machine output when this second time delay elapses, then the entire machine is shut down by disconnecting it from its power source. In other words, if the voltage reducing circuit does not perform its intended function in a predetermined time interval, the machine is shut off and must be repaired before normal welding operation can again be performed.

DETAILED DESCRIPTION OF THE PREFERRED EMBODIMENTS

Figure 1:
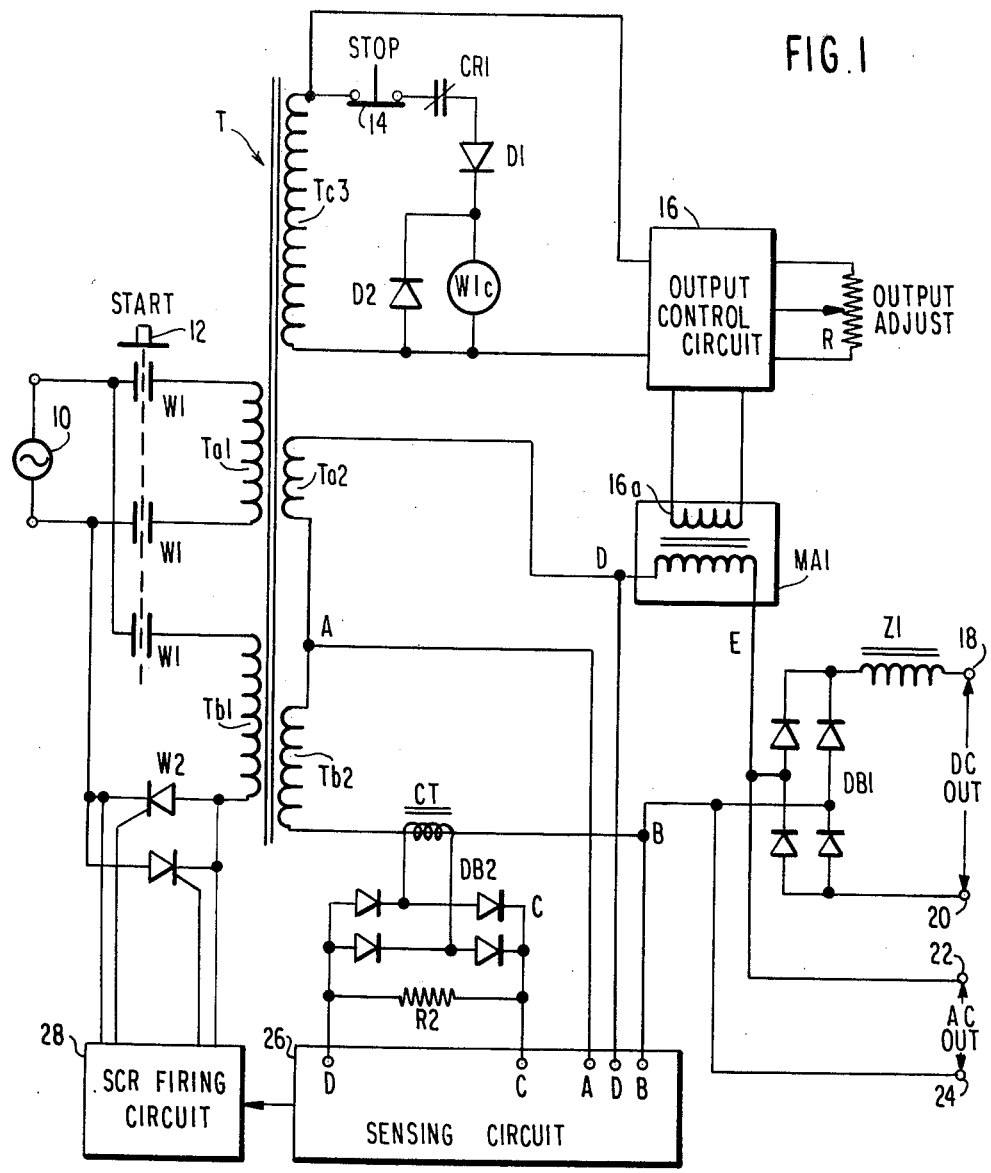
FIG. 1 is a schematic block and circuit diagram illustrating the preferred embodiment of the invention.

In FIG. 1, a welding transformer T is connected across a sixty cycle A.C. power source 10. The transformer has two primary windings Ta1 and Tb1 which are connected in parallel across the power source. Ganged contactors W1 are disposed in both sides of primary winding Ta1 and in the upper side of primary winding Tb1. A solid state SCR contactor W2 is disposed in the lower side of primary winding Tb1. When the start button 12 is manually depressed, the contacts of contactor W1 are closed, thereby energizing the transformer primary winding Ta1 and its associated secondary winding Ta2, as well as the tertiary winding Tc3 which supplies power to the contactor operating coil W1c through the closed stop button 14 and the normally closed (N.C.) contacts CR1, thereby holding contactors W1 closed when button 12 is released. The tertiary winding also supplies power to a conventional output circuit 16 which controls the welding current supplied through a magnetic amplifier MA1 to the welder D.C. output terminals 18, 20 and A.C. output terminals 22, 24.

The common terminal D of a welding current-sensing circuit 26 is connected to the upper side of the transformer secondary winding Ta2, and a terminal A is connected to the lower side thereof, thereby providing power to the sensing circuit 26. Using this configuration, the input terminal B of sensing circuit 26 does not have to be isolated from the rest of the circuitry.

The welding current is sensed by a current transformer CT coupled to the lower side of secondary winding Tb2. The welding current signal induced in the current transformer is rectified and applied to terminal C of the sensing circuit 26. In order to strike an arc for D.C. welding, the operator places a welding electrode connected to the output terminal 18 in contact with a workpiece connected to the output terminal 20, thereby instantaneously loading the output of the welder. (For A.C. welding, the load occurs between output terminals 22 and 24.). A voltage is developed across the controllable inductor or magnetic amplifier MA1, and a current flows in both transformer secondary windings Ta2 and Tb2. (Output control circuit 16 is conventional; potentiometer R adjusts the firing angle of internal SCR's to adjust the magnitude of the control current supplied to the control coil 16a of magnetic amplifier MA1). However, prior to the striking of the arc, only the primary winding Ta1 was energized because the solid state contactor W2 was in the off or open state, thereby deenergizing the primary winding Tb1 in which case secondary winding Tb2 does not contribute power to the load. Since a normal welding operation cannot be maintained using only the output from one secondary winding, at the instant the welding electrode contacts the workpiece the primary winding Tb1 must immediately be energized so that the operator us unable to discern any difference between starting the arc with this welding machine versus a machine having a continuous OCV of, for example, eighty volts. The use of a solid state current sensing circuit (FIG. 2) and the solid state contactor 22 accomplishes this result. The welding output current is sensed by the current transformer CT, and the induced A.C. signal is rectified by the diodes in rectifier DB2 and fed to the current sensing circuit 26 at terminal C thereof. (The voltage across the magnetic amplifier MA1 can also be used as the signal to the sensing circuit 26 to indicate that an arc has been struck, but the use of this voltage signal may prove unreliable under some combinations of the welding machine setting, electrode sizes and the magnitude of the output welding current).

Figure 2:
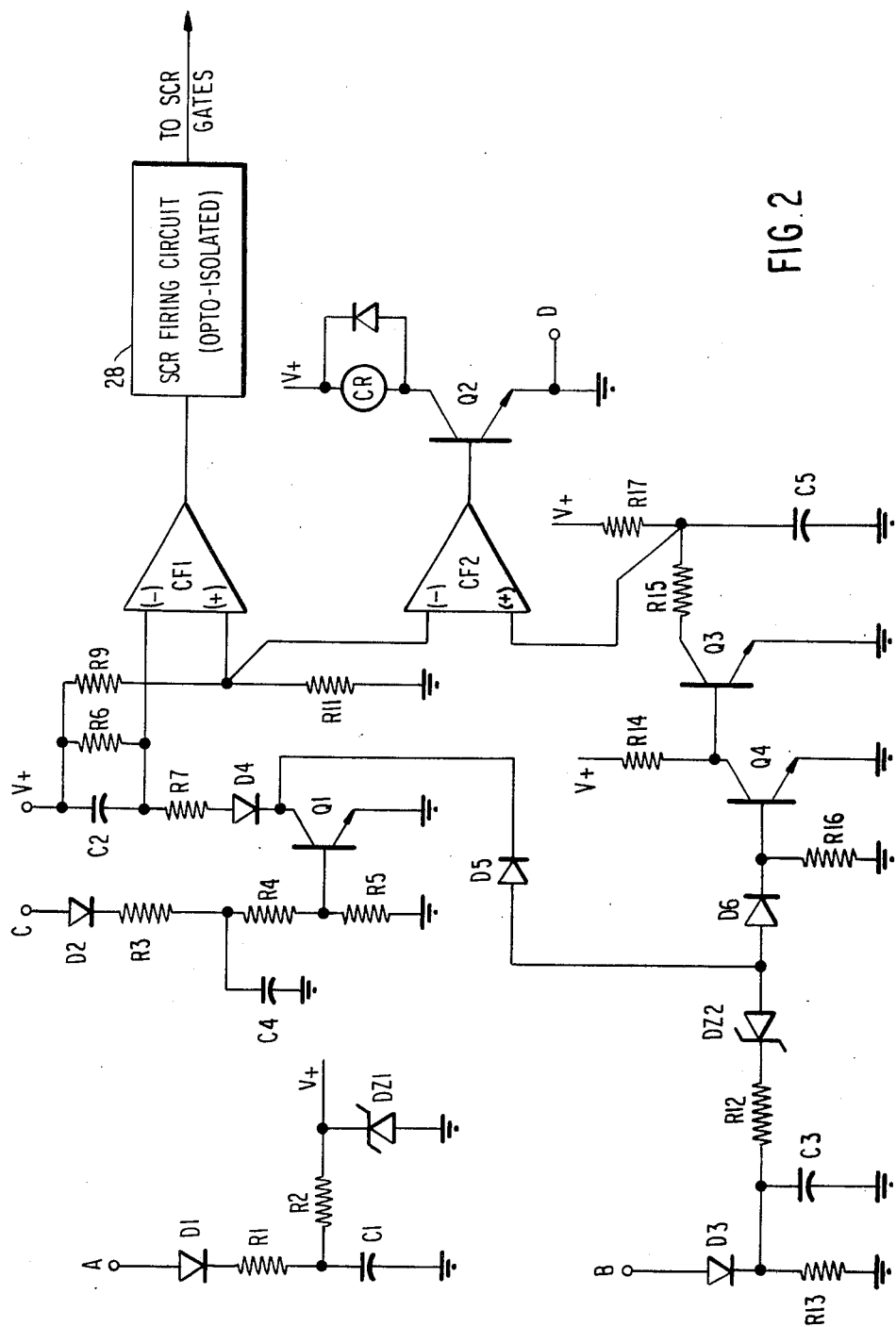
FIG. 2 is a schematic circuit diagram illustrating a preferred embodiment of the current-sensing circuit for automatically operating the voltage reducing circuit.

In FIG. 2 there is shown a schematic diagram of a preferred embodiment of the sensing circuit 26. A regulated voltage of V+ for biasing the sensing circuit is provided by connecting terminal A of the sensing circuit to a point between the two secondary windings Ta2 and Tb2. The regulated power supply consists of a diode D1, resistors R1 and R2, a capacitor C1 and a Zener diode BZ1. Prior to the striking of an arc, transistor Q1 is off, capacitor C2 is discharged, the voltage at the (−) input of the operational amplifier-comparator CF1 is higher than that at the (+) input, and the output of comparator CF1 is low. This low signal inhibits the SCR firing circuit 28, and the contactor W2 is thus in the off or open condition. When an arc is struck and the resulting output current is sensed by the current transformer CT1, a voltage indicative of the current appears at terminal C, transistor Q1 is turned on and, thus, capacitor C2 is rapidly charged via resistor R7, thereby causing the voltage at the (−) input of comparator CF1 to become lower than that at the (+) input, whereby the output of comparator CF1 goes high to allow the oscillator in the SCR firing circuit 28 immediately to send a 10KHz gating signal to the SCR's in contactor W2 to turn it on. Thus, the transformer primary winding Tb1 is immediately energized to provide the full OCV which allows the normal welding arc to be maintained. If the arc is then broken so that output welding current ceases to flow, the voltage at terminal C from the current transformer CT is removed, thereby again turning off transistor Q1. Thus, capacitor C2 is allowed to discharge through the resistor R6, and the voltage at the (−) input of comparator CF1 rises at a rate determined by the time constant of capacitor C2 and resistor R6. When the voltage at the (−) input of comparator CF1 reaches and exceeds that at the (+) input, the output of comparator CF1 again goes low, thereby inhibiting the oscillator in the SCR firing circuit 28 whereby the solid state contactor W2 is opened or turned off, the transformer primary winding Tb1 is deenergized, and the welder output voltage again drops to the standby voltage of approximately 36V.

If a malfunction occurs in the sensing circuit 26, the SCR firing circuit 28 or the SCR contactor W2, such that the output voltage of the welding machine does not revert to its low standby level of approximately 36V within the time delay predetermined by the time constant of resistor R6 and capacitor C2, the voltage on a capacitor C5, connected to the (+) input of a second comparator CF2, will reach and exceed the voltage at the (−) input of comparator CF2, thereby causing the output of CF2 to go from its normal low state to a high state. This high output of comparator CF2 will then turn on transistor Q2, thereby energizing relay coil CR and opening its normally closed (N.C.) contacts CR1 connected in series with the contactor coil W1c. Thus, coil W1c is immediately deenergized, thereby breaking the holding circuit for the three contactors W1 which immediately open to disconnect both of the transformer primaries Ta1 and Tb1 from the power source 10. In other words, the machine is shut down by removing all input power therefrom in the same manner as if the stop button 14 had been depressed.

Capacitors C5 is allowed to charge only when both the machine full OCV is present and also there is no output welding current. These conditions are both met after the welding arc is terminated and before the machine output voltage returns to its low standby value. At this time, capacitor C5 is allowed to charge through resistor R17 when transistor Q4 is turned on thereby turning off transistor Q3. When the output voltage at terminal B exceeds the breakdown voltage of the Zener diode DZ2, the base of transistor Q4 is biased on because transistor Q1 has been turned off due to the absence of a welding current signal from the welding current-sensing transformer CT. Thus, as soon as the arc is broken, capacitor C5 begins to charge just as capacitor C2 begins to discharge through resistor R6. The time constant of resistor R17 and capacitor C5 is chosen to be longer than that of resistor R6 and capacitor C2, such that under normal operation the voltage on capacitor C5 never reaches the switching level of comparator CF2 before the output of comparator CF1 goes low, contactor W2 is opened (turned off) and the machine output voltage at terminal B goes to its low standby level thereby turning off transistor Q4, turning on transistor Q3 and rapidly discharging capacitor C5 through resistor 15. However, if a malfunction should occur in the circuits, the fail-safe feature comes into play because the voltage on capacitor C5 will then reach the switching level of comparator CF2, and the machine will be shut down as described above.

If the operator should be welding at an abnormally high voltage, 60V, for example, such a voltage might be high enough to break down Zener diode DZ2 and forward bias transistor Q4 into conduction, thereby allowing capacitor C5 to charge and cause the machine to turn off. To eliminate the possibility of such a nuisance, resistor Q4 is not allowed to turn on (even though the voltage at terminal B is high when welding current is flowing, because a diode D5 shunts the base of transistor Q4 to ground via the transistor Q1 which, of course, is on whenever output current is flowing. Therefore, there must be a combination of both high output voltage and also no output current before capacitor C5 is allowed to charge.

Figure 1A:
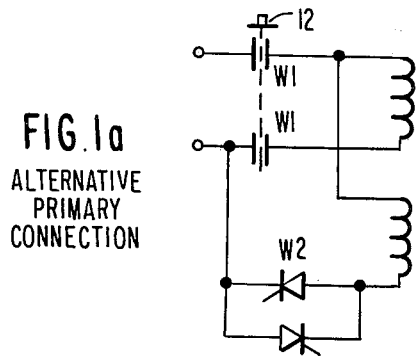
FIG. 1a and 1b illustrate alternative connections of the primary windings of the welding transformer illustrated in FIG. 1.
Figure 1B:
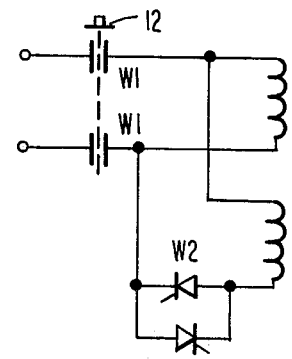

FIGS. 1a and 1b illustrate alternative connections for the primary windings of transformer T. The transformer is configured with two separate primary and secondary windings. The windings may be on a common core or they may be separate cores. In the embodiment illustrated in FIG. 1, the "a" coils and the "b" coils were mounted on the outside legs, respectively, of an E type core. The power source was designed to have an OCV of 80V. Windings "a" have a turns ratio which produces in secondary winding Ta2 an OCV of approximately 36V, and windings "b" a turns ratio which produces in secondary winding Tb2 an OCV of 44V.

We claim:

1. In an arc welding power supply of the type including transformer means having its primary side connectable to an A.C. power source and having its secondary side connected across output terminals connectable to a welding electrode and a work piece, respectively, the improvement:

wherein the primary side of said transformer means comprises first and second primary windings connected in parallel, and the secondary side of said transformer means comprises first and second secondary windings connected in series, so that full open circuit voltage is applied across said output terminals when both primary windings are connected to the power source, and so that a standby voltage lower than the full open circuit voltage is applied across said output terminals when only one of said primary windings is connected to the power source; and comprising voltage-reducing circuit means, connected in said secondary side of said transformer means and responsive to the absence of welding current in said secondary side for a first predetermined time period, for disconnecting said second primary winding from the power source to reduce the voltage across said terminals to said lower standby voltage.

2. The improvement defined in claim 1 further comprising fail-safe circuit means responsive to the simultaneous occurrence to full open circuit voltage across said output terminals and no welding current for a second predetermined time period which terminates after said first time period has lapsed, for disconnecting said transformer means, including both of said primary windings, from the power source.

3. The improvement of claim 2 wherein said voltage-reducing circuit means comprises:

normally non-conducting first transistor means connected in series with a first capacitor, said first transistor means being responsive to the striking of a welding arc to become conducting, thereby permitting said first capacitor quickly to charge to a first predetermined voltage; and switch means responsive to said first predetermined voltage for connecting both of said primary windings to the power source.

4. The improvement of claim 3 wherein said first transistor means is rendered non-conducting by the absence of welding current after an arc is struck, and further comprising a discharging circuit connected to said first capacitor for discharging said first capacitor toward a second predetermined voltage during said first time period determined by the time constant of said discharging circuit, said switch means being responsive to said second predetermined voltage to disconnect only said second primary winding from the power source.

5. The improvement of claim 4 wherein said fail-safe circuit means comprises:

a second capacitor;

second transistor means connected to said second capacitor and responsive to the simultaneous occurrence of full open circuit voltage across said output terminals and the absence of welding current for causing said second capacitor to charge to a third predetermined voltage at the end of said second time period, said switch means being responsive to said third predetermined voltage to disconnect both of said primary windings from the power source.

6. The improvement of claim 5 wherein the charging time constant of said second capacitor is longer that the time constant of said discharging circuit.

* * * * *